US011924392B2

(12) United States Patent
Huang

(10) Patent No.: US 11,924,392 B2
(45) Date of Patent: Mar. 5, 2024

(54) METHOD FOR MITIGATING 3D CROSSTALK AND 3D DISPLAY

(71) Applicant: Acer Incorporated, New Taipei (TW)

(72) Inventor: Chao-Shih Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 99 days.

(21) Appl. No.: 17/578,491

(22) Filed: Jan. 19, 2022

(65) Prior Publication Data

US 2023/0179752 A1 Jun. 8, 2023

(30) Foreign Application Priority Data

Dec. 2, 2021 (TW) ................................. 110145013

(51) Int. Cl.
*H04N 13/125* (2018.01)
*H04N 13/378* (2018.01)

(52) U.S. Cl.
CPC ......... *H04N 13/125* (2018.05); *H04N 13/378* (2018.05)

(58) Field of Classification Search
CPC .. H04N 13/125; H04N 13/378; H04N 13/305; H04N 13/366
USPC .......................................................... 348/51
See application file for complete search history.

(56) References Cited

U.S. PATENT DOCUMENTS

| 2014/0354785 A1* | 12/2014 | Fang | ...................... G02B 27/62 348/51 |
| 2018/0143683 A1* | 5/2018 | Kang | ................... H04N 13/371 |
| 2019/0191149 A1* | 6/2019 | Lee | ...................... H04N 13/371 |

FOREIGN PATENT DOCUMENTS

| CN | 103686133 | 3/2014 |
| CN | 104683786 | 6/2015 |
| CN | 105072431 | 11/2015 |
| CN | 110662012 | 1/2020 |
| TW | I526046 | 3/2016 |

* cited by examiner

*Primary Examiner* — Christopher S Kelley
*Assistant Examiner* — Ana Picon-Feliciano
(74) *Attorney, Agent, or Firm* — JCIPRNET

(57) ABSTRACT

The disclosure provides a method for mitigating 3D crosstalk and a 3D display. The method includes: detecting first and second eye positions of a user, and determining a viewing angle of the user and a rotation angle of a head of the user accordingly; estimating a first reference position and a first midpoint position between first and second eyes of the user based on the first and second eye positions of the user; obtaining a second reference position, and estimating a difference between the first and second reference positions; correcting the first midpoint position to a second midpoint position based on the rotation angle of the user and the difference; and determining a first pixel for projecting to the first eye and a second pixel for projecting to the second eye among the pixels of the 3D display based on the second midpoint position.

18 Claims, 7 Drawing Sheets

METHOD FOR MITIGATING 3D CROSSTALK AND 3D DISPLAY

CROSS-REFERENCE TO RELATED APPLICATION

This application claims the priority benefit of Taiwan application serial no. 110145013, filed on Dec. 2, 2021. The entirety of the above-mentioned patent application is hereby incorporated by reference herein and made a part of this specification.

BACKGROUND

Technical Field

The disclosure relates to a 3D (three-dimensional) display technology, and particularly relates to a method for mitigating 3D crosstalk and a 3D display.

Description of Related Art

The existing auto-stereoscopic 3D displays first place the pixels for the left eye and the right eye respectively at the corresponding pixel positions of a display panel, and then project the images for the left eye and the right eye respectively to the correct eyes through a liquid crystal control light path in a 3D lens element. Since the images need to be focused on the left and right eyes, the 3D lens element generally has an arc design, so that the images for the left (right) eye are able to be focused on and projected to the left (right) eye. However, some of the lights may be projected to the wrong eye owing to the limitation of the refraction light path. In other words, the images for the left (right) eye are mistakenly projected to the right (left) eye, and this phenomenon is called 3D crosstalk.

Typically, the auto-stereoscopic 3D displays are generally provided with eye tracking systems, which are able to precisely project 3D images of low crosstalk to the eyes according to the eye positions of the user, thereby allowing the user to freely move and watch 3D images within a limited range. For reducing 3D crosstalk, the auto-stereoscopic 3D displays are generally further set with 3D weavers, which are able to attenuate the pixels or subpixels that may be projected to the wrong eye according to the results of the light path simulation, thereby reducing the 3D crosstalk situation of the entire screen.

Referring to FIG. 1, which is a schematic diagram of an operating mechanism of a conventional auto-stereoscopic 3D display. Typically, a midpoint position of the eyes of the user is generally used as a reference point when judging whether a pixel or subpixel corresponds to the left eye or the right eye. In FIG. 1, it is assumed that an auto-stereoscopic 3D display 100 includes multiple pixels 101 (shown as lattices) and a 3D lens element 102. In addition, it is assumed that a user in FIG. 1 faces the auto-stereoscopic 3D display 100.

In this case, after performing the eye tracking to obtain the shown midpoint position, the auto-stereoscopic 3D display 100 is able to accordingly determine which of the pixels 101 are adapted to project a light to the right eye of the user, and which of the pixels 101 are adapted to project the light to the left eye of the user. For example, the pixels 101 shown as a dot-pattern lattice may be determined to be adapted to project the light to the left eye of the user, and the pixels 101 shown as an oblique-line lattice may be determined to be adapted to project the light to the left eye of the user.

However, the midpoint position of the eyes of the user used as the reference point may turn out to be imprecise when the user rotates his or her head. In this case, the effect of mitigating 3D crosstalk may be slightly reduced.

SUMMARY

In light of the above, the disclosure provides a method for mitigating 3D crosstalk and a 3D display.

The disclosure provides a method for mitigating 3D crosstalk applicable to a 3D display, including the following. A first eye position and a second eye position of a user are detected, and a viewing angle of the user and a rotation angle of a head of the user are determined according to the first eye position and the second eye position of the user; a first reference position and a first midpoint position between a first eye and a second eye of the user are estimated based on the first eye position and the second eye position of the user; a second reference position is obtained, and a difference between the first reference position and the second reference position is estimated; the first midpoint position is corrected to a second midpoint position based on the rotation angle of the user and the difference; and at least one first pixel adapted to project a light to the first eye of the user and at least one second pixel adapted to project a light to the second eye of the user, among multiple pixels of the 3D display, are determined based on the second midpoint position.

The disclosure provides a 3D display, including an eye tracking device and a processor. The eye tracking device detects a first eye position and a second eye position of a user. The processor is configured to: determine a viewing angle of the user and a rotation angle of a head of the user according to the first eye position and the second eye position; estimate a first reference position and a first midpoint position between a first eye and a second eye of the user based on the first eye position and the second eye position of the user; obtain a second reference position, and estimate a difference between the first reference position and the second reference position; correct the first midpoint position to a second midpoint position based on the rotation angle of the user and the difference; and determine at least one first pixel adapted to project a light to the first eye of the user and at least one second pixel adapted to project a light to the second eye of the user, among multiple pixels of the 3D display, based on the second midpoint position.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. the drawings illustrate exemplary embodiments of the disclosure and, together with the description, serve to explain the principles of the disclosure.

DESCRIPTION OF THE EMBODIMENTS

Figure 1:
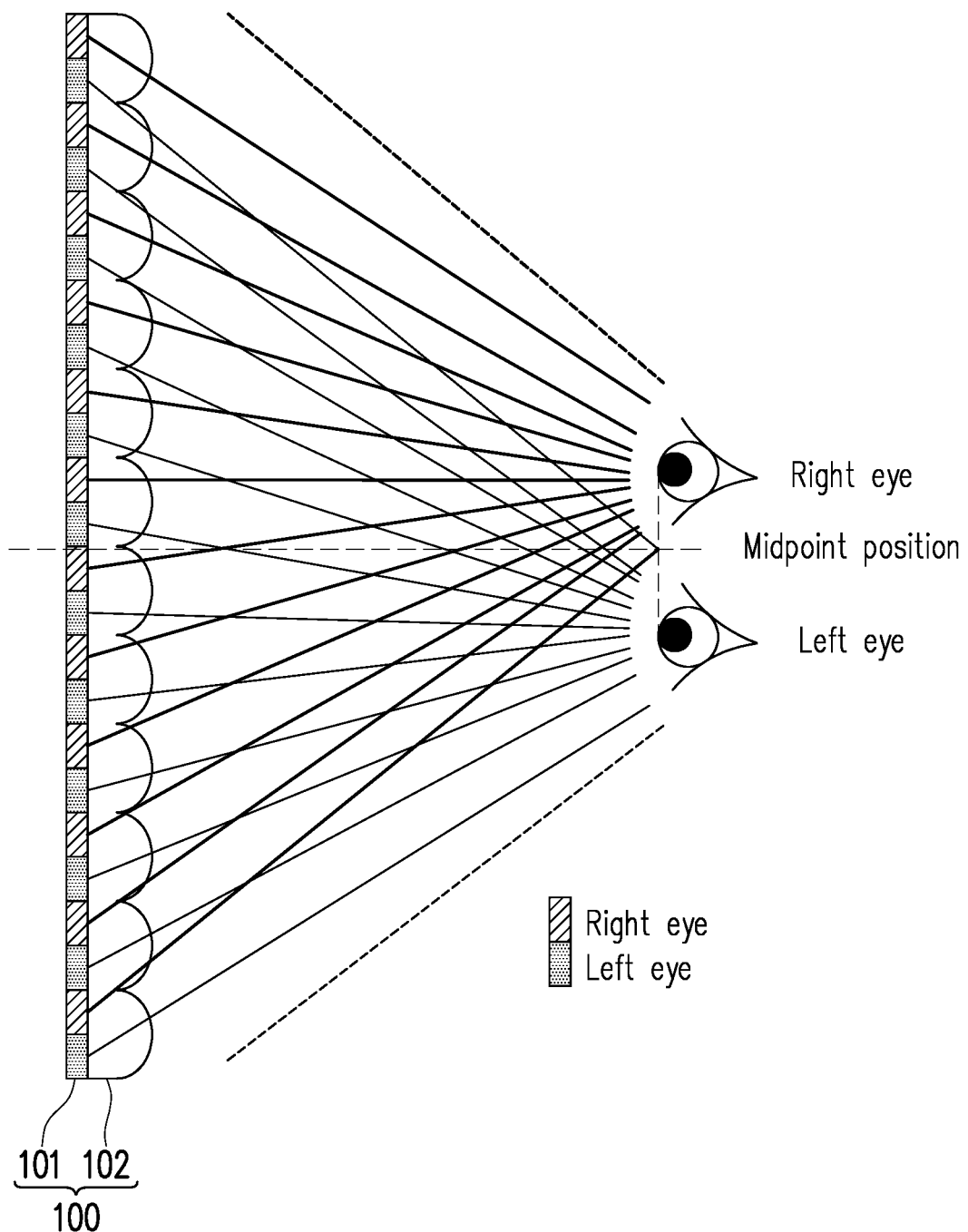
FIG. 1 is a schematic diagram of an operating mechanism of a conventional 3D weaver.
Figure 2:
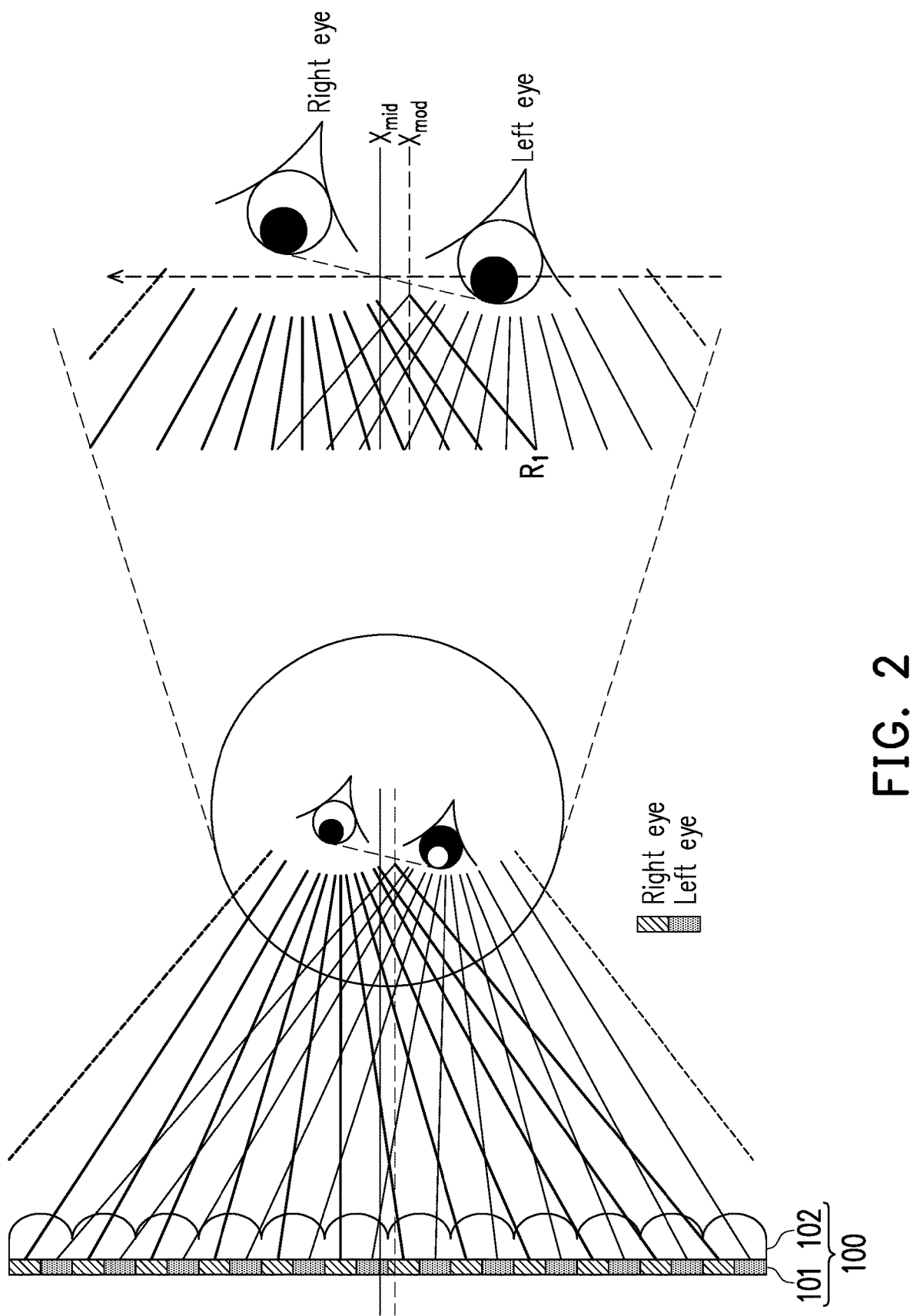
FIG. 2 is a schematic diagram of 3D crosstalk according to one embodiment of the disclosure.

Referring to FIG. 2, which is a schematic diagram of 3D crosstalk according to one embodiment of the disclosure, when a user rotates his or her head, other 3D crosstalk situations may occur if the pixels for projecting a light to either eye are still determined based on a midpoint position (hereinafter referred to as a first midpoint position $X_{mid}$) between the user's eyes.

Taking FIG. 2 for instance, a light path $R_1$ that should be directed to a right eye may be mistakenly classified as corresponding to a left eye because the light path $R_1$ is smaller than the reference point, with the first midpoint position $X_{mid}$ as a reference point. In this case, the left eye becomes aware of the 3D crosstalk because the left eye receives a light corresponding to the light path $R_1$, which may further affect a viewing experience of the user.

However, if the first midpoint position $X_{mid}$ may be corrected to a second midpoint position $X_{mod}$ through a kind of mechanism, the light path $R_1$ may be correctly assigned to correspond to the right eye, thereby improving the 3D crosstalk situation.

In view of this, the disclosure provides a method for mitigating 3D crosstalk, which is adapted to improve the above-mentioned technical issue.

Figure 3:
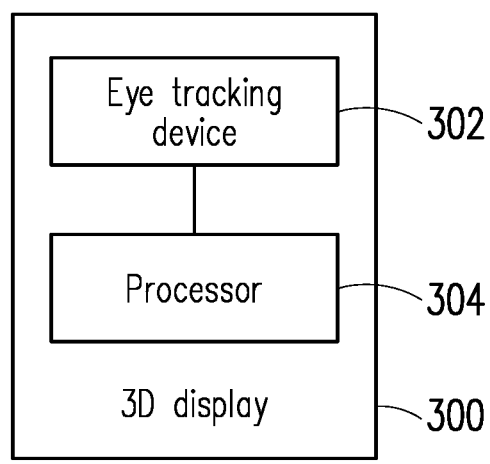
FIG. 3 is a schematic diagram of a 3D display according to one embodiment of the disclosure.

Referring to FIG. 3, which is a schematic diagram of a 3D display according to one embodiment of the disclosure, in the embodiment of the disclosure, a 3D display 300 is, for example, an auto-stereoscopic 3D display. That is to say, when the user stands in front of the 3D display 300, the user may directly watch contents displayed with 3D effects on the 3D display 300 with naked eyes.

As shown in FIG. 3, the 3D display 300 may include an eye tracking device 302 and a processor 304. In some embodiments, the eye tracking device 302 is able to perform eye tracking on the user located in front of the 3D display 300, thereby obtaining positions of the eyes of the user in a three-dimensional space. For clear description, the positions of the eyes of the user are referred to as a first eye position and a second eye position in the following.

In some embodiments, the 3D display 300 may have, for example, the aforementioned pixels corresponding to the left eye and the right eye, a 3D lens element, a 3D weaver, etc., but components of the 3D display 300 may not be limited thereto.

The processor 304 is coupled to the eye tracking device 302, and may be a general-purpose processor, a special-purpose processor, a traditional processor, a digital signal processor, multiple microprocessors, one or more microprocessors combined with a core of the digital signal processor, a controller, a microcontroller, an application specific integrated circuit (ASIC), a field programmable gate array (FPGA), any other types of integrated circuits, a state machine, a processor based on an advanced RISC machine (ARM) and the like.

In the embodiment of the disclosure, the processor 304 may access specific modules and program codes to realize the method for mitigating 3D crosstalk provided by the disclosure, details of which are described as follows.

Figure 4:
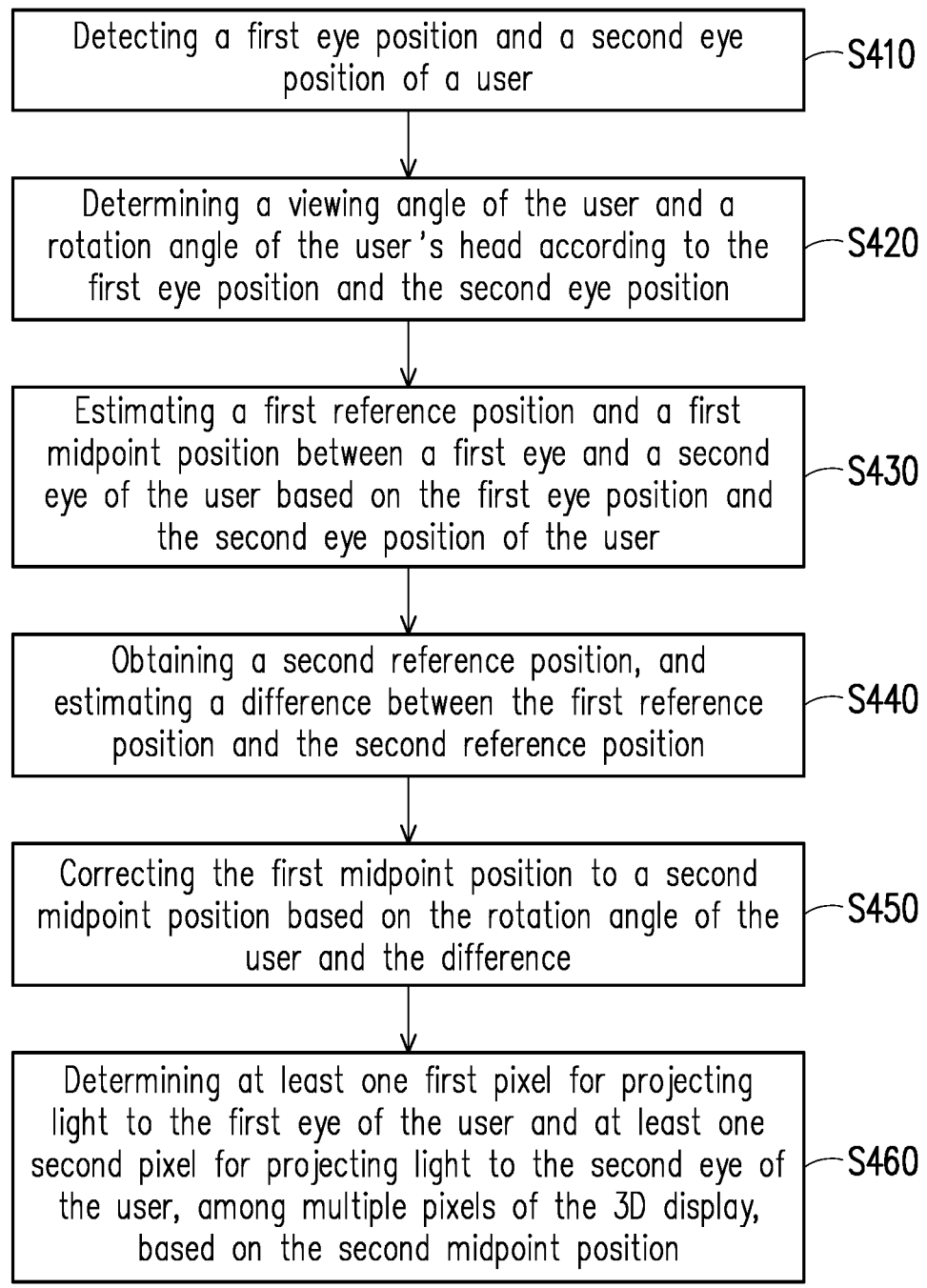
FIG. 4 is a flow chart of a method for mitigating 3D crosstalk according to one embodiment of the disclosure.

Referring to FIG. 4, which is a flow chart of the method for mitigating 3D crosstalk according to one embodiment of the disclosure, the method of this embodiment may be performed by the 3D display 300 of FIG. 3. The details of each step in FIG. 4 are described below with reference to the components of FIG. 3.

First of all, in step S410, the first eye position and the second eye position of the user are detected by the eye tracking device 302. In one embodiment, an x-axis coordinate and a z-axis coordinate of the first eye position (such as a left eye position) may be respectively represented as $x_L$ and $z_L$, and an x-axis coordinate and a z-axis coordinate of the second eye position (such as a right eye position) may be respectively represented as $x_R$ and $z_R$.

Next, in step S420, a viewing angle δ of the user and a rotation angle θ of the user's head are determined by the processor 304 according to the first eye position and the second eye position. In one embodiment, the rotation angle θ is obtained based on a formula "θ=tan$^{-1}$ [$(z_R-z_L)/(x_R-x_L)$]", for example. Besides, the viewing angle δ is obtained based on a formula "δ=90°−θ", for example.

In the embodiment of the disclosure, when the user faces the 3D display 300, the rotation angle θ of the user's head may be set as, for example, 0 degree, and the viewing angle δ may be correspondingly estimated to be, for example, 90 degrees.

Then, in step S430, a first reference position $Z_δ$ and the first midpoint position $X_{mid}$ between a first eye (such as the left eye) and a second eye (such as the right eye) of the user are estimated by the processor 304 according to the first eye position and the second eye position of the user.

In one embodiment, the processor 304 may select any point from the z-axis coordinate of the first eye position to the z-axis coordinate of the second eye position as the first reference position $Z_δ$, for example. In one embodiment, the first reference position $Z_δ$ is obtained by the processor 304 based on, for example, a formula "$Z_δ=(z_R+z_L)/2$", but the disclosure is not limited thereto.

Moreover, the processor 304 may select any point from the x-axis coordinate of the first eye position to the x-axis coordinate of the second eye position as the first midpoint position $X_{mid}$, for example. In one embodiment, the first midpoint position $X_{mid}$ is obtained by the processor 304 based on, for example, a formula "$X_{mid}=(x_R+x_L)/2$", but the disclosure is not limited thereto.

In step S440, a second reference position $Z_{90}$ is obtained by the processor 304, and a difference $Z_{diff}$ between the first reference position $Z_δ$ and the second reference position $Z_{90}$ is estimated. In one embodiment, whether the viewing angle δ complies with a predetermined condition may be first determined by the processor 304 in a process of obtaining the second reference position $Z_{90}$. If so, the second reference position $Z_{90}$ is set as the first reference position $Z_δ$ by the processor 304; if not, a first historical reference position corresponding to the viewing angle of the user compliant with the predetermined condition last time may be obtained by the processor 304 as the second reference position.

In one embodiment, whether the viewing angle δ equals to 90 degrees may, for example, be determined by the processor 304 in a process of determining whether the viewing angle δ complies with the predetermined condition. If so, the processor 304 determines that the viewing angle δ complies with the predetermined condition; otherwise, the processor 304 determines that the viewing angle δ does not comply with the predetermined condition, but the disclosure is not limited thereto. That is to say, the processor 304 may determine whether the user faces the 3D display 300; if so, the viewing angle δ is determined compliant with the predetermined condition, and the second reference position $Z_{90}$ is further set as the current first reference position $Z_\delta$, and then subsequent calculations are performed.

On the other hand, if the processor 304 determines that the viewing angle δ does not comply with the predetermined condition (for example, the user does not face the 3D display 300), then the processor 304 may take the first reference position obtained when the user faces the 3D display 300 last time as the first historical reference position, and further set the second reference position $Z_{90}$ as the first historical reference position.

In one embodiment, it is assumed that the corresponding viewing angle δ may be estimated by the processor 304 according to the current first and second eye positions at different time points. Assuming that at a t−i time point, the current viewing angle (indicated as $δ_{t−i}$) has been determined compliant with the predetermined condition by the processor 304 according to the current first and second eye positions of the user, then the first reference position (indicated as $Z_\delta^{t−i}$) obtained at the moment may be taken as the second reference position $Z_{90}$ by the processor 304. Next, assuming that the viewing angle $δ_{t−i+1}$ obtained at a t−i+1 time point does not comply with the predetermined condition, then $Z_\delta^{t−i}$ may be adopted as the second reference position $Z_{90}$ when step S440 corresponding to the t−i+1 time point is performed by the processor 304, and the difference (indicated as $Z_{diff}^{t−i+1}$) between the current first reference position (indicated as $Z_\delta^{t−i+1}$) and the second reference position (i.e., $Z_\delta^{t−i}$) is further estimated accordingly.

If none of the viewing angles obtained from a t−i+2 time point to the t−1 time point complies with the predetermined condition, the processor 304 may estimate the corresponding difference based on the above teachings.

Next, assuming that the viewing angle (indicated as $δ_t$) obtained at a t time point complies with the predetermined condition again, the first reference position obtained currently (indicated as $Z_\delta^t$) may be taken as the second reference position $Z_{90}$ by the processor 304. Then, assuming that the viewing angle $δ_{t+1}$ obtained at a t+1 time point does not comply with the predetermined condition, then $Z_{\delta hu\ t}$ may be adopted as the second reference position $Z_{90}$ when step S440 corresponding to the t+1 time point is performed by the processor 304, and the difference (indicated as $Z_{diff}^{t+1}$) between the current first reference position (indicated as $Z_\delta^{t+1}$) and the second reference position (i.e., $Z_\delta^t$) is further estimated accordingly.

In other embodiments, a designer may also set a determining mechanism adapted to determine whether the viewing angle δ complies with the predetermined condition based on needs of the designer. For example, the processor 304 may also determine that the viewing angle δ complies with the predetermined condition when the viewing angle δ falls within a certain range (for instance, from 90−k to 90+k, where k is an arbitrary value), but the disclosure is not limited thereto.

After the second reference position $Z_{90}$ is obtained based on the above teachings, the difference $Z_{diff}$ may be obtained by the processor 304 based on, for example, "$Z_{diff}=Z_\delta−Z_{90}$", but the disclosure is not limited thereto.

Then, in step S450, the first midpoint position $X_{mid}$ is corrected to the second midpoint position $X_{mod}$ by the processor 304 based on the rotation angle θ of the user and the difference $Z_{diff}$. In one embodiment, the second midpoint position $X_{mod}$ may be obtained by the processor 304 based on a formula "$X_{mod}=X_{mid}+Z_{diff}×\tan(θ/2)$", but the disclosure is not limited thereto.

In step S460, at least one first pixel adapted to project a light to the first eye of the user (for example, the left eye) and at least one second pixel adapted to project a light to the second eye of the user (for example, the right eye), among the pixels of the 3D display 300, may be determined by the processor 304 based on the second midpoint position $X_{mod}$.

In one embodiment, different from conventional techniques that regard the first midpoint position $X_{mid}$ as the reference point, the processor 304 may regard the second midpoint position $X_{mod}$ as the reference point instead, and accordingly further determine the pixels (i.e., the first pixels) for projecting a light to the first eye of the user and the pixels (i.e., the second pixels) for projecting a light to the second eye of the user, among the pixels of the 3D display 300.

In this way, as shown in FIG. 2, the light path $R_1$ mistakenly classified for projecting the light to the left eye is corrected to project the light to the right eye after the processor 304 takes the second midpoint position $X_{mod}$ as the reference point instead. As a result, the 3D crosstalk situation experienced by the user is mitigated accordingly, thereby improving the user's experience of viewing the 3D display 300.

Furthermore, the user may generally rotate his or her head with the first eye as the axis or with the second eye as the axis, and the displacement amounts of the left and right eyes relative to $Z_{90}$ may be used to estimate whether the rotation axis of the head of the user is closer to the left or the right eye. The eye with a smaller z-displacement amount is regarded as the rotation axis; the z-displacement of the right eye is $z_{diff,R}=z_R−z_{R,90}$, and the z-displacement of the left eye is $z_{diff,L}=z_L−z_{L,90}$. If $|z_{diff,R}|<|z_{diff,L}|$, the rotation axis falls on the right eye; otherwise, the rotation axis falls on the left eye, and the method of the disclosure is suitable for the two situations. For making the above concepts more understandable, the following descriptions are supplemented with FIG. 5A and FIG. 5B.

Figure 5A:
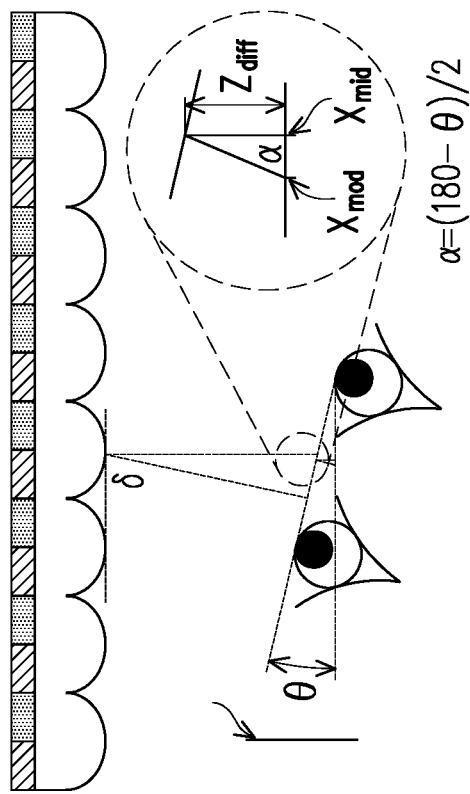
FIG. 5A is a schematic diagram illustrating a situation where a head rotates with a first eye as an axis according to one embodiment of the disclosure.

Referring to FIG. 5A, which is a schematic diagram illustrating a situation where the head rotates with the first eye as the axis according to one embodiment of the disclosure, when the user rotates his or her head clockwise by the rotation angle θ with a first eye E1 (for example, the left eye) as the axis, a relationship between the second midpoint position $X_{mod}$ and the first midpoint position $X_{mid}$ may be represented as a relational formula "$X_{mod}=X_{mid}+Z_{diff}×\tan(θ/2)$".

Figure 5B:
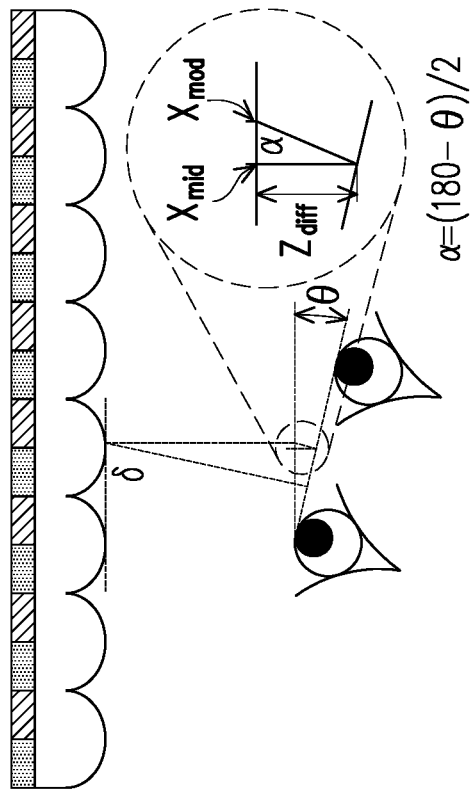
FIG. 5B is a schematic diagram illustrating a situation where the head rotates with a second eye as the axis according to one embodiment of the disclosure.

Further referring to FIG. 5B, which is a schematic diagram illustrating a situation where the head rotates with the second eye as the axis according to one embodiment of the disclosure, when the user rotates his or her head counterclockwise by the rotation angle θ with a second eye E2 (for example, the right eye) as the axis, the relationship between the second midpoint position $X_{mod}$ and the first midpoint position $X_{mid}$ may also be represented as the relational formula "$X_{mod}=X_{mid}+Z_{diff}×\tan(θ/2)$".

Figure 6:
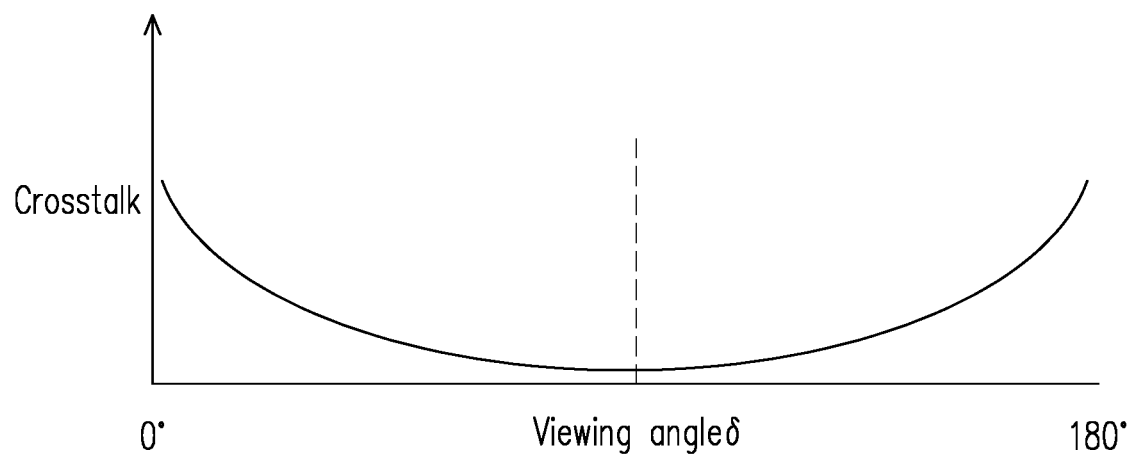
FIG. 6 is a diagram illustrating a corresponding relationship between a viewing angle and crosstalk according to one embodiment of the disclosure.

Referring to FIG. 6, which is a diagram illustrating a corresponding relationship between the viewing angle and the crosstalk according to one embodiment of the disclosure, as shown in FIG. 6, when the viewing angle δ is 90 degrees, the degree of the crosstalk experienced by the user is the lowest. When the viewing angle δ gradually increases/ decreases from 90 degrees, the degree of the crosstalk experienced by the user is gradually increased.

In the embodiment of the disclosure, 3D crosstalk is mitigated by the method described in the above embodiments, but some pixels may inevitably project the light to the wrong eye when the viewing angle δ is too large.

Figure 7:
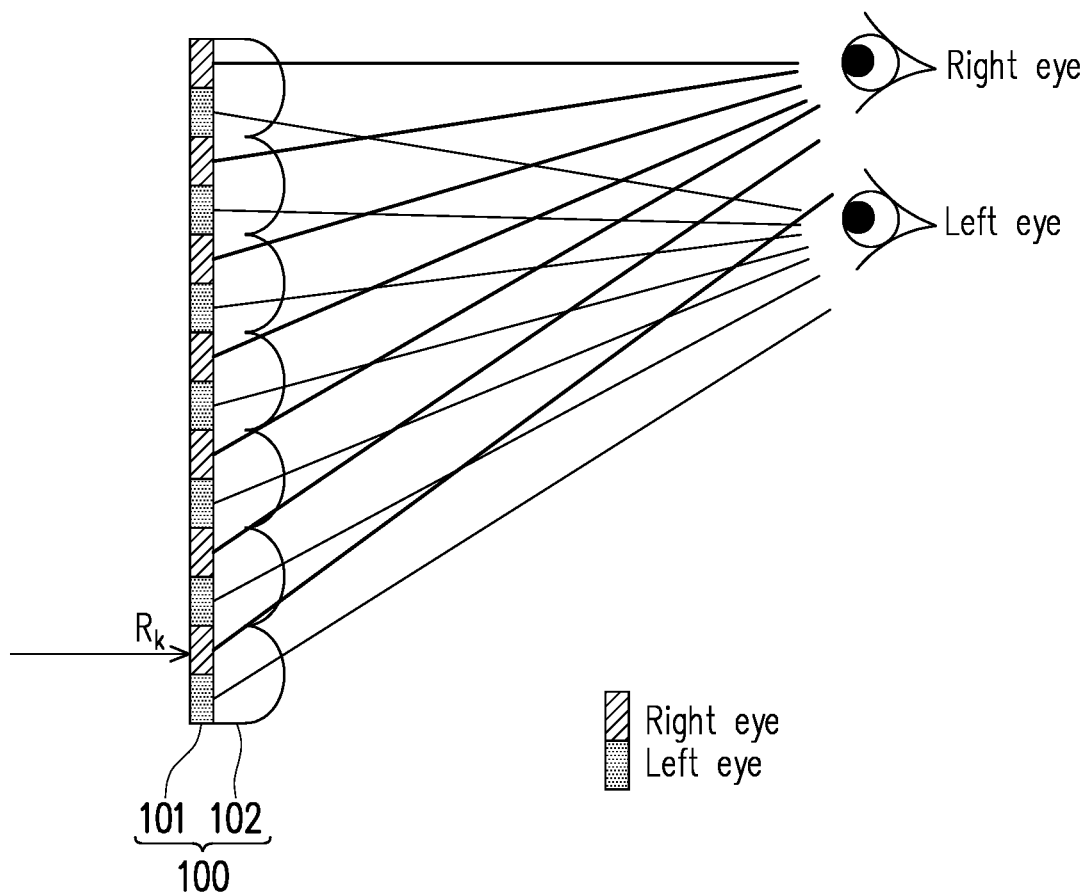
FIG. 7 is a diagram illustrating a situation of a large viewing angle according to one embodiment of the disclosure.

Referring to FIG. 7, which is a diagram illustrating a situation of a large viewing angle according to one embodiment of the disclosure, in the situation of FIG. 7, assuming that a pixel $R_k$ is planned to project a light to the right eye of the user, owing to the overly-large viewing angle δ of the user, the light emitted from the pixel $R_k$ may be affected by the structure of a 3D lens element 102 and be unnecessarily refracted. In this case, the light emitted from the pixel $R_k$ may mistakenly enter the left eye of the user, thereby causing the 3D crosstalk situation.

In view of this situation, the disclosure further provides a corresponding processing mechanism, which is able to attenuate the light projected by the some pixels described above, thereby mitigating 3D crosstalk.

In one embodiment, the processor 304 finds out at least one potential error pixel from the aforementioned first pixels (corresponding to the first eye) according to the first eye position and the second eye position of the user. In the embodiment of disclosure, the potential error pixel is, for example, a pixel that may project the light to the wrong eye, like the pixel $R_k$.

Typically, in a manufacturing process of the 3D display 300, the pixels used by the 3D display 300 to project lights and the corresponding light projection angles when the user is located at a certain position in front of the 3D display 300 may be learned through simulation, and the relative positions between the light projected by each pixel and the 3D lens element 102 may be known beforehand. In other words, when the eye positions of the user are known, which pixels project the light to the eye and the angles thereof may all be known beforehand through simulation.

Therefore, which pixels may result in the situation of the pixel $R_k$ as shown in FIG. 7 may also be inferred accordingly after the eye positions of the user are known. On this basis, the processor 304 regards the pixels which may result in the situation of the pixel $R_k$, as shown in FIG. 7, as the above-mentioned potential error pixels after obtaining the eye positions of the user.

Next, the processor 304 obtains an angle difference between the viewing angle δ of the user and a reference angle and further determines an attenuation coefficient accordingly, and the attenuation coefficient may be negatively correlated with the above angle difference (i.e., the greater the angle difference is, the smaller the attenuation coefficient is, and vice versa). Then, the processor 304 reduces the intensity of a projection light of each potential error pixel based on the attenuation coefficient. In one embodiment, the attenuation coefficient is, for example, a value less than 1, and the processor 304 multiplies the intensity of the projection light of each potential error pixel by the attenuation coefficient to reduce the intensity of the projection light corresponding to each potential error pixel.

In one embodiment, the aforementioned reference angle may be set as, for example, 90 degrees (i.e., the viewing angle with the lowest degree of crosstalk). In this case, the processor 304 obtains an angle difference between the viewing angle δ and 90, for example. As shown in FIG. 6, the greater the angle difference is, the more serious the current crosstalk situation becomes. Hence, the processor 304 may select a smaller attenuation coefficient to significantly reduce the intensity of the projection light of each potential error pixel.

Since the intensity of the projection light of each potential error pixel has been reduced through the above-mentioned mechanism, even if the light projected by each potential error pixel enters the wrong eye, the eye is less affected. In this way, the user's experience of viewing the 3D display is improved accordingly.

In short, according to the embodiments of the disclosure, the first midpoint position is corrected to the second midpoint position based on the rotation angle of the head of the user and the difference between the first and the second reference positions, and then the second midpoint position is taken as the reference point to determine which pixels in the 3D display are adapted to project the light to the left eye of the user and which pixels in the 3D display are adapted to project the light to the right eye of the user. Compared with the conventional techniques that take the first midpoint position as the reference point, the embodiments of the disclosure are able to correspondingly mitigate 3D crosstalk, thereby improving the user's viewing experience of the 3D display.

In addition, when the viewing angle of the user is too large and causes some pixels to unavoidably project the light to the wrong eye, the embodiments of the disclosure are able to reduce the intensity of the projection light of these pixels, thereby reducing the interference of these pixels caused to the user.

Although the disclosure has been described with reference to the above embodiments, it will be apparent to one of ordinary skill in the art that modifications to the described embodiments may be made without departing from the spirit and scope of the disclosure. Accordingly, the scope of the disclosure will be defined by the attached claims and not by the above detailed descriptions.

What is claimed is:

1. A method for mitigating 3D crosstalk, adapted for a 3D display, comprising:
    detecting a first eye position and a second eye position of a user, and determining a viewing angle of the user and a rotation angle of a head of the user according to the first eye position and the second eye position of the user;
    estimating a first reference position and a first midpoint position between a first eye and a second eye of the user based on the first eye position and the second eye position of the user;
    obtaining a second reference position, and estimating a difference between the first reference position and the second reference position, wherein obtaining the second reference position comprises:
        obtaining a first historical reference position corresponding to the viewing angle of the user compliant with a predetermined condition last time in response to determining that the viewing angle of the user does not comply with the predetermined condition, and taking the first historical reference position as the second reference position;
    correcting the first midpoint position to a second midpoint position based on the rotation angle of the user and the difference; and
    determining at least one first pixel adapted to project a light to the first eye of the user and at least one second pixel adapted to project a light to the second eye of the user, among a plurality of pixels of the 3D display, based on the second midpoint position.

2. The method of claim 1, wherein obtaining the second reference position comprises:
setting the second reference position as the first reference position in response to determining that the viewing angle of the user complies with a predetermined condition.

3. The method of claim 2, comprising: determining that the viewing angle of the user complies with the predetermined condition in response to determining that the viewing angle of the user is 90 degrees.

4. The method of claim 1, wherein an x-axis coordinate and a z-axis coordinate of the first eye position are respectively represented as $X_L$ and $Z_L$, an x-axis coordinate and a z-axis coordinate of the second eye position are respectively represented as $X_R$ and $Z_R$, and the rotation angle of the head of the user is represented as $\theta$, and $\theta=\tan^{-1}[(z_R-z_L)/(x_R-x_L)]$.

5. The method of claim 1, wherein the rotation angle of the head of the user is represented as $\theta$, and the viewing angle of the user is represented as $\delta$, and $\delta=90'-\theta$.

6. The method of claim 1, wherein an x-axis coordinate and a z-axis coordinate of the first eye position are respectively represented as $x_L$ and $z_L$, an x-axis coordinate and a z-axis coordinate of the second eye position are respectively represented as $x_R$ and $z_R$, and the first midpoint position is represented as $X_{mid}$, and $X_{mid}=(x_R+x_L)/2$.

7. The method of claim 1, wherein the first midpoint position is represented as $X_{mid}$, the difference is represented as $Z_{diff}$, the second midpoint position is represented as $X_{mod}$, and the rotation angle of the head of the user is represented as $\theta$, and $X_{mod}=X_{mid}+X_{diff}\times\tan(\theta/2)$.

8. The method of claim 1, wherein a z-axis coordinate of the first eye position is represented as $z_L$, a z-axis coordinate of the second eye position is represented as $z_R$, and the first reference position is represented as $Z_\delta$, and $Z_\delta=(z_R+z_L)/2$.

9. The method of claim 1, wherein after determining the at least one first pixel adapted to project the light to the first eye of the user and the at least one second pixel adapted to project the light to the second eye of the user, among the plurality of pixels of the 3D display, based on the second midpoint position, the method further comprises:
finding out at least one potential error pixel from the at least one first pixel according to the first eye position and the second eye position of the user;
obtaining an angle difference between the viewing angle of the user and a reference angle, and determining an attenuation coefficient according to the angle difference, wherein the attenuation coefficient is negatively correlated with the angle difference; and
reducing an intensity of a projection light of each potential error pixel based on the attenuation coefficient.

10. A 3D display, comprising:
an eye tracking device, which detects a first eye position and a second eye position of a user;
a processor, configured to:
determine a viewing angle of the user and a rotation angle of a head of the user according to the first eye position and the second eye position;
estimate a first reference position and a first midpoint position between a first eye and a second eye of the user based on the first eye position and the second eye position of the user;
obtain a second reference position, and estimate a difference between the first reference position and the second reference position, wherein obtaining the second reference position comprises:
obtaining a first historical reference position corresponding to the viewing angle of the user compliant with a predetermined condition last time in response to determining that the viewing angle of the user does not comply with the predetermined condition, and taking the first historical reference position as the second reference position;
correct the first midpoint position to a second midpoint position based on the rotation angle of the user and the difference; and
determine at least one first pixel adapted to project a light to the first eye of the user and at least one second pixel adapted to project a light to the second eye of the user, among a plurality of pixels of the 3D display, based on the second midpoint position.

11. The 3D display of claim 10, wherein the processor performs:
setting the second reference position as the first reference position in response to determining that the viewing angle of the user complies with a predetermined condition.

12. The 3D display of claim 11, wherein the processor performs:
determining that the viewing angle of the user complies with the predetermined condition in response to determining that the viewing angle of the user is 90 degrees.

13. The 3D display of claim 10, wherein an x-axis coordinate and a z-axis coordinate of the first eye position are respectively represented as $x_L$ and $z_L$, an x-axis coordinate and a z-axis coordinate of the second eye position are respectively represented as $x_R$ and $z_R$, and the rotation angle of the head of the user is represented as $\theta$, and $\theta=\tan^{-1}[(z_R-z_L)/(x_R-x_L)]$.

14. The 3D display of claim 10, wherein the rotation angle of the head of the user is represented as $\theta$, and the viewing angle of the user is represented as $\delta$, and $\delta=90°-\theta$.

15. The 3D display of claim 10, wherein an x-axis coordinate and a z-axis coordinate of the first eye position are respectively represented as $x_L$ and $z_L$, an x-axis coordinate and a z-axis coordinate of the second eye position are respectively represented as $x_R$ and $z_R$, and the first midpoint position is represented as $X_{mid}$, and $X_{mid}=(x_R+x_L)/2$.

16. The 3D display of claim 10, wherein the first midpoint position is represented as $X_{mid}$, the difference is represented as $Z_{diff}$, the second midpoint position is represented as $X_{mod}$, and the rotation angle of the head of the user is represented as $\theta$, and $X_{mod}=X_{mid}+z_{diff}\times\tan(\theta/2)$.

17. The 3D display of claim 10, wherein a z-axis coordinate of the first eye position is represented as $z_L$, a z-axis coordinate of the second eye position is represented as $z_R$, and the first reference position is represented as $Z_\delta$, and $Z_\delta=(z_R+z_L)/2$.

18. The 3D display of claim 10, wherein after determining the at least one first pixel adapted to project the light to the first eye of the user and the at least one second pixel adapted to project the light to the second eye of the user, among the plurality of pixels of the 3D display, based on the second midpoint position, the processor further performs:
finding out at least one potential error pixel from the at least one first pixel according to the first eye position and the second eye position of the user;
obtaining an angle difference between the viewing angle of the user and a reference angle, and determining an attenuation coefficient according to the angle difference, wherein the attenuation coefficient is negatively correlated with the angle difference; and reducing an intensity of a projection light of each potential error pixel based on the attenuation coefficient.

* * * * *